United States Patent [19]

Tamano et al.

[11] Patent Number: 5,100,927
[45] Date of Patent: Mar. 31, 1992

[54] PROCESS FOR PRODUCING RIGID POLYURETHANE FOAM

[75] Inventors: Yutaka Tamano, Tokuyama; Shuichi Okuzono, Shinnanyo; Masaki Ishida, Kudamatsu; Shoji Arai; Hiroyuki Yoshimura, both of Shinnanyo, Japan

[73] Assignee: Tosoh Corporation, Shinnanyo, Japan

[21] Appl. No.: 533,753

[22] Filed: Jun. 6, 1990

[30] Foreign Application Priority Data

| Jun. 6, 1989 | [JP] | Japan | 1-142133 |
| Sep. 12, 1989 | [JP] | Japan | 1-234671 |
| Oct. 6, 1989 | [JP] | Japan | 1-259974 |

[51] Int. Cl.$^5$ .............. C08G 18/16; C08J 9/08; C08L 75/04
[52] U.S. Cl. .................... 521/163; 521/128; 521/129; 521/137
[58] Field of Search ............... 521/120, 129, 137, 163

[56] References Cited

U.S. PATENT DOCUMENTS

| 4,444,704 | 4/1984 | Hira et al. | 521/129 |
| 4,717,738 | 1/1988 | Fukuda et al. | 521/137 |
| 4,981,880 | 1/1991 | Lehmann et al. | 521/125 |

Primary Examiner—John Kight, III
Assistant Examiner—John M. Cooney, Jr.
Attorney, Agent, or Firm—Oblon, Spivak, McClelland, Maier & Neustadt

[57] ABSTRACT

A process for producing a rigid polyurethane foam by use of a decreased amount of a CFC blowing agent and an increased amount of water used as a blowing agent, maintaining a high degree of heat insulation and improving the deterioration in friability of the product. The catalyst is one of the imidazoles represented by the formula (I):

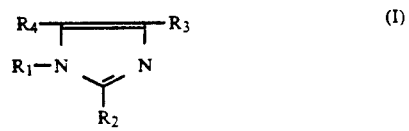

where $R^1$ is alkyl having 1 to 4 carbons, benzyl, dimethylaminopropyl, or hydroxyalkyl having 1 to 3 carbons; $R^2$ is hydrogen, alkyl having 1 to 4 carbons, allyl, or benzyl; and $R^3$ and $R^4$ are independently hydrogen, methyl, or hydroxymethyl.

8 Claims, No Drawings

PROCESS FOR PRODUCING RIGID POLYURETHANE FOAM

BACKGROUND OF THE INVENTION

1. Field of the Invention

The present invention relates to a process for producing rigid polyurethane foam.

2. Description of the Background

Rigid polyurethane foams are usually produced by agitating and mixing instantaneously a polyisocyanate and a polyol containing a blowing agent (a chlorofluorocarbon, i.e., CFC which is a halogenated hydrocarbon, and water), a catalyst, a silicone foam stabilizer, and other optional additives, and foaming the mixture. Rigid polyurethanes are widely used for heat insulators in fields of application requiring hot insulation or cold insulation such as building materials, boards, electric refrigerators and manufacturing plants, for example, because of their light weight and superior heat-insulating properties. Spray foaming thereof is advantageous in applicability to in-place foaming.

A rigid polyurethane foam is an urethane resin which has a structure having independent cells, namely closed cells, where a CFC compound and water used as blowing agents are enclosed in individual cells as CFC gas having low heat conductivity and carbon dioxide gas having a relatively high heat conductivity resulting from the reaction of water with an isocyanate. Accordingly, for the purpose of improving heat insulation properties, conventional formulations generally employed have been such that, as the blowing agent, water is used in a minimum amount and a CFC compound is used in a larger amount: for example, 0 to 1.5 parts by weight of water, and 35 to 60 parts by weight of a CFC compound based on 100 parts by weight of the polyol. Catalysts employed generally include triethylenediamine, tetramethylhexamethylenediamine and dimethylcyclohexylamine, for example. With such a formulation, useful rigid polyurethane foams have been produced industrially.

As mentioned above, the heat insulation properties of conventional rigid polyurethane foams have been improved by increasing the amount of the CFC compounds used to lower the thermal conductivity.

Recently, however, it has been suggested that CFC compounds may destroy the ozone layer of the earth. Consequently, the regulation of CFC use has started throughout the world to virtually eliminate the use of CFCs by the end of this century. On the other hand, the use of a conventionally large amount of the HCFC (hydrochlorofluorocarbon) alternatives for CFCS, which exhibit a low ozone destruction coefficient, is not desirable from the stand point of production cost. Thus, a need clearly exists for a technique which can minimize the use of CFCs in the production and use of rigid polyurethane foams.

For this purpose, formulations have been, and are being, investigated in which the amount of the CFC is decreased, and instead, the amount of water is increased as the blowing agent. However, this poses several technical problems. For example, the use of a larger amount of water as the blowing agent generates carbon dioxide gas which fills the cell in large amount in place of the CFC gas, which lowers the CFC concentration in the cells and adversely affects the heat conductivity. The increase of the amount of water in the formulation also causes an increase in formation of urea linkages having higher crystallinity by reaction of the isocyanate with water, in addition to the normal urethane-forming reaction of a polyol with an isocyanate. Thus, the foam becomes brittle, or becomes worse in friability.

The deterioration in friability is especially remarkable in the case where diphenylmethane-4,4'-diisocyanate and/or a polymeric isocyanate thereof is used as the isocyanate, and in the case where toluene diisocyanate and/or a mixture thereof with the prepolymer thereof is used. The deterioration in friability causes many problems such as a decrease in strength of the foam, and a decrease of adhesiveness between a foam material and a surface material, for example, all which are great technical problems. In the case of spray-foamed rigid polyurethanes produced by use of a conventional catalyst, such as triethylenediamine or tetramethylhexamethylenediamine, for example, another problem is involved in that adhesiveness to a plate material, particularly an iron plate, a gypsum board, for example, becomes significantly lower when foamed at a low temperature, especially during winter.

Since the primary object is to decrease the amount of CFC which is used, the deterioration in heat conductivity appears to be unavoidable to some extent. However, the deterioration in friability is a serious problem relating to the usefulness of the products.

Thus, a need continues to exist for a rigid polyurethane foam which has superior properties even when using a decreased amount of CFC.

SUMMARY OF THE INVENTION

Accordingly, it is an object of the present invention to provide a process for producing a rigid polyurethane foam having a decreased amount of CFC therein.

It is also an object of the present invention to provide a process for producing a rigid polyurethane foam having a foam density of from 10 to 60 kg/m$^3$.

The above objects and others are attained by a process for producing a rigid polyurethane foam having a foam density of from 10 to 60 kg/m$^3$ by reacting a polyol with a polyisocyanate in the presence of a catalyst, a blowing agent, and a foam stabilizer; said blowing agent comprising water in an amount of not less than 2.0 parts by weight and a halogenated hydrocarbon in an amount of not more than 35 parts by weight based on 100 parts by weight of the polyol; said catalyst being at least one of the imidazoles represented by the formula (I):

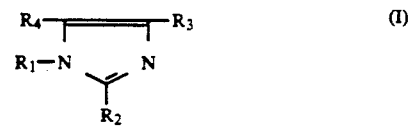

where $R^1$ is alkyl having 1 to 4 carbons, benzyl, dimethylaminopropyl, or hydroxyalkyl having 1 to 3 carbons; $R^2$ is hydrogen, alkyl having 1 to 4 carbons, allyl, or benzyl; and $R^3$ and $R^4$ are independently hydrogen, methyl, or hydroxymethyl.

DETAILED DESCRIPTION OF THE PREFERRED EMBODIMENTS

In accordance with the present invention, it has been discovered that by using an imidazole compound as a catalyst in a process for producing a rigid polyurethane foam, a surprising improvement in heat conductivity and friability is obtained in the product. The present process utilizes a decreased amount of a CFC blowing agent and an increased amount of water as a blowing agent, while surprisingly maintaining a high degree of heat insulation and improving the deterioration in friability of the product.

In detail, the invention provides a process for producing a rigid polyurethane foam having a foam density of from 10 to 60 kg/m³ by reacting a polyol with a polyisocyanate in the presence of a catalyst, a blowing agent, a foam stabilizer, and other optional additives; the blowing agent comprising water in an amount of not less than 2.0 parts by weight and a halogenated hydrocarbon in an amount of not more than 35 parts by weight based on 100 parts by weight of the polyol; and the catalyst being at least one of the imidazoles represented by the formula (I):

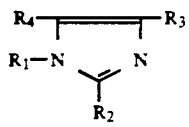

where $R^1$ is alkyl having 1 to 4 carbons, benzyl, dimethylaminopropyl, or hydroxyalkyl having 1 to 3 carbons; $R^2$ is hydrogen, alkyl having 1 to 4 carbons, allyl, or benzyl; and $R^3$ and $R^4$ are independently hydrogen, methyl, or hydroxymethyl.

The halogenated hydrocarbons used as the blowing agent in the present invention include known halogenated methanes and halogenated ethanes, the preferable ones being CFCs such as trichloromonofluoromethane (R-11), HCFCs such as, dichlorotrifluoroethane (R-123), and dichloromonofluoroethane (R-141b), for example.

The water is used in an amount of 2.0 parts by weight or more, preferably in the range of 3.0 to 10.0 parts by weight based on 100 parts of the polyol. In a spray foaming method, the amount is 0.5 parts by weight or more, preferably in the range of 2.0 to 10.0 parts by weight. Particularly, when the amount of water used is 3.0 parts by weight or more, the saving of CFC is remarkable, resulting in a significant improvement of the formulation. However, when the amount of water used is 10.0 parts by weight or more, the friability and heat conductivity obtained are quite unsatisfactory, which is disadvantageous in the physical properties of the products.

The CFC is used in an amount of 35 parts by weight or less, preferably in the range of from 0 to 30 parts by weight, but in spray foaming, the amount used is 60 parts by weight or less, preferably 50 parts by weight or less.

The ratio of water to CFC which is used cannot be limited generally, and is dependent on the intended density.

The catalyst used in the present invention is an imidazole represented by the formula (I) shown above. Among the imidazoles, particularly preferable are 1-methylimidazole, 1,2-dimethylimidazole, 1-(3-dimethylaminopropyl)imidazole, 1-n-butyl-2-methylimidazole, and 1-isobutyl-2-methylimidazole.

The amine catalyst in the present invention is generally used in an amount of from 0.02 to 10 parts by weight based on 100 parts by weight of the polyol. Additionally, a known cocatalyst may be suitably used if the catalyst characteristics of the present invention is not lost. Examples of the cocatalysts which may be used are tertiary amine catalysts including triethylenediamine, tetramethylhexamethylenediamine, and dimethylcyclohexylamine; organic carboxylate salts of the tertiary amine catalyst with formic acid, acetic acid, and octylic acid, for example, and organic tin compounds, or organic lead compounds, for example.

The polyisocyanate used in the present invention may be a known organic polyisocyanate, including aromatic polyisocyanates such as toluene diisocyanate, diphenylmethane-4,4'-diisocyanate, polymeric isocyanates thereof, and the like; aliphatic isocyanates such as hexamethylene diisocyanate, and the like; alicyclic polyisocyanate such as isophorone diisocyanate, and the like; isocyanate-terminated prepolymer such as toluene diisocyanate prepolymer, diphenylmethane-4,4'-diisocyanate prepolymer, and the like prepared by reacting the above polyisocyanate with a polyol; modified isocyanates such as carbodiimide-modified isocyanates; and mixed polyisocyanates thereof. Among them, preferable are diphenylmethane-4,4'-diisocyanate and polymeric isocyanate thereof (crude MDI), and mixed polyisocyanate of crude MDI with toluene diisocyanate and/or prepolymer thereof (TDI prepolymer). In the mixed polyisocyanates containing crude MDI and TDI prepolymer, those containing TDI prepolymer in an amount of not more than 70% by weight, particularly preferably in the range of from 5 to 60% by weight are suitably used because of satisfactory heat conductivity. In the spray foaming, crude MDI is more preferably used.

The polyols used in the present invention include known tertiary-amino-containing polyols, oxyalkylated polyhydric alcohols, polyesterpolyols, and the like.

The tertiary-amino-containing polyols include polyols derived by adding an alkylene oxide, such as ethylene oxide and propylene oxide, to ammonia, hydrazine; an aliphatic polyamine such as ethylenediamine, diethylenetriamine, and triethylenetetramine; a heterocyclic polyamine such as N-aminoethylpiperazine; an aromatic polyamine such as toluenediamine, and diphenylmethane-4,4'-diamine; an alkanolamine such as mono-, di-, and tri-ethanolamine; a mixture thereof; or the like. The oxyalkylated polyhydric alcohols include polyols derived by adding an alkylene oxide, such as ethylene oxide and propylene oxide, to a polyhydric alcohol such as glycol, glycerin, bisphenol, pentaerythritol, trimethylol propane, sucrose, and the like or a mixture thereof. The polyesterpolyols include those derived by condensing an aliphatic polycarboxylic acid such as adipic acid, maleic acid, and fumaric acid, or an aromatic polycarboxylic acid such as phthalic acid, terephthalic acid, and isophthalic acid, with a polyhydric alcohol; and those produced from polyethylene terephthalate waste. For the rigid polyurethane foams of the present invention, the polyol used has an average hydroxyl value in the range of 200 to 600, and for spray-foamed ones, in the range from 200 to 800.

For spray methods, preferable polyols include tertiary-amino-containing polyols, oxyalkylated polyhydric alcohols, and mixtures thereof. Particularly preferable are mixed systems containing 10% by weight or more of tertiary-amino-containing polyol. The tertiary-amino-containing polyol particularly preferably used are ethylene-oxide- and/or propylene-oxide-adducts of ethylenediamine, diethylenetriamine, triethlenetetramine, N-aminoethylpiperazine, toluene diamine, and diphenylmethane-4,4'-diamine. The oxyalkylated polyhydric alcohols particularly preferably used are ethylene-oxide- and/or propylene-oxide-adducts of sucrose and of polyhydric alcohol mixtures mainly composed of sucrose.

The useful foam stabilizers include known silicone type foam stabilizers for rigid polyurethane foams such as siloxane-oxyalkylene block copolymers and the like, and other various surfactants, usually in an amount ranging from 0.5 to 2.5 parts by weight based on 100 parts by weight of the polyol although the amount is not specially limited.

Further in the present invention, other auxiliary agents may be added if necessary. For example, a flame retardant may be added, which includes reactive flame retardants such as phosphorus-containing polyols like propoxylated phosphate, propoxylated dibutyl pyrophosphate, etc. derived by addition reaction of an alkylene oxide to a phosphorus-containing acid; phosphate triesters such as tricresyl phosphate and the like; halogen-containing phosphate triesters such as tris-(2-chloroethyl) phosphate, tris-(chloropropyl) phosphate, and the like; halogen-containing organic compounds such as dibromopropanol, dibromoneopentylglycol, tetrabromo-bisphenol A, and the like; inorganic compounds such as antimony oxide, magnesium carbonate, calcium carbonate, aluminum phosphate, and the like; and so on. The amount thereof to be used need not be limited, usually being, however, in the range of from 4 to 20 parts by weight based on 100 parts by weight of polyol depending on the required flame resistance. other additives which may be used include coloring agents such as pigments, fillers such as perlite, stabilizers such as antioxidants and UV-absorbers.

The rigid polyurethane foam produced from the above-mentioned polyol and polyisocyanate in the present invention has a foam density in the range of from 10 to 60 kg/m$^3$.

The present invention enables improvement in friability which is deteriorated when, as the blowing agent, the amount of CFC is decreased and the amount of water is increased in rigid polyurethane foam systems, while maintaining the heat insulation of the foams at a superior level within an acceptable range. The present formulation makes it feasible to produce a rigid polyurethane foam with a decreased amount of CFC as a blowing agent, which has hitherto been regarded as being difficult to do. In other words, the process for producing a rigid polyurethane foam of the present invention provides a novel formulation to meet the environmental pollution problem regarding CFC compounds because of the decreased amount of CFC which is used as a blowing agent.

Further, in a spray-foamed rigid polyurethane foam system, low-temperature adhesiveness which often poses the problem can be improved. The effect is remarkable particularly in a system where amount of CFC is decreased and the amount of water is increased as the blowing agents. The product has high foam hardness from the time immediately after the reaction, and is superior in curing function and foam properties.

The present invention will now be further illustrated by reference to certain Examples which are provided solely for purposes of illustration and are not intended to be limitative.

EXAMPLES 1-13, AND COMPARATIVE EXAMPLE 1-7

The mixing ratio of the component materials (namely the formulations) were as shown below. With variation of the amount of water and trichlorofluoromethane (R-11), and the catalyst, the foaming tests were conducted under predetermined conditions. The friability and the properties of the resulting foams were measured by the methods described below. The results of the tests are shown in Table 1 and Table 2.

| a. Formulation: | |
|---|---|
| Polyol[1] | 100 parts by weight |
| Foam stabilizer[2] | 1.5 parts by weight |
| Water | 3.0–7.0 parts by weight |
| R-11[3] | 5–40 parts by weight |
| Catalyst[4] | Varied |
| Isocyanate[5] | (NCO/OH = 1.10) |

[1]Sucrose/aromatic amine type polyol, OH value = 423 mgKOH/g, (SU-464/NT-400 made by Mitsui Toatsu Chemicals, Inc.)
[2]Silicone surfactant (L-5340, made by NIHON Unicar Co., LTD.)
[3]Trichlorofluoromethane (made by Mitsui Fluorochemical K.K.)
[4]Catalyst used and the abbreviation of the catalyst in the Tables:
NMIZ: 1-methylimidazole
DMIZ: 1,2-dimethylimidazole
DMAPIZ: 1-(3-dimethylaminopropyl)imidazole
IBIZ: 1-isobutyl-2-methylimidazole
TEDA-L33: 33% triethylenediamine solution in dipropylene glycol (TEDA-L33, made by Tosoh Corporation)
TMHMDA: tetramethylhexamethylenediamine (TOYOCAT-MR, made by Tosoh Corporation)
DMCHA: dimethylcyclohexylamine
[5]Crude MDI: NCO concentration = 31.0% (MR-200, made by NIHON Polyurethane Co., LTD.) and sucrose type TDI prepolymer: NCO concentration = 31.0% b. Foaming conditions:
Starting material liquid temperature: 20±1° C.
Stirring speed: 6000 rpm (5 seconds)
Mold: Foamed in aluminum box (dimension: 25×25×25 cm)
Mold temperature: 40° C.
c. Measured items:
The items below were measured.
Reactivity:
  Cream time: Time lapse before start of foaming (seconds)
  Gel time: Time for resinification (cobwebbing) (seconds)
  Tack-free time: Time lapse before the surface of the foam becomes tack-free (seconds)
  Rise time: Time lapse before the foam stops rising (seconds)
Friability:
  The brittleness of the foam was evaluated in the four grades below by pressing the surface of the foam with a finger 10 minutes after completion of foam formation.
  Remarkably brittle: X
  Brittle: Δ
  Slightly brittle: ○
  Not brittle: ⊙
Foam density and Thermal conductivity:
  The density was measured of the test piece prepared by cutting the central portion of the foam into a size of 20 ×20×2.5 cm. The thermal conductivity was measured of the test piece as it was by use of ANACON model 88.

As is evident from Table 1 and Table 2, rigid polyurethane foams being satisfactory in thermal conductivity and friability were obtained in Examples 1–3 where the amount of the CFC was decreased and the amount of the water was increased as the blowing agent, and NMIZ, DMIZ, and DMAPIZ were used as the catalyst respectively. On the contrary, in Comparative examples 1-7, a decrease in the of amount of CFC was not achievable because the increase of water deteriorated the friability.

| a. Formulation | |
|---|---|
| Polyol A[1] | 50 parts by weight |
| Polyol B[2] | 50 parts by weight |
| Foam stabilizer[3] | 1 parts by weight |
| Water | 3 parts by weight |

TABLE 1

| | Examples | | | | | | Comparative examples | | | | Example |
|---|---|---|---|---|---|---|---|---|---|---|---|
| | 1 | 2 | 3 | 4 | 5 | 6 | 1 | 2 | 3 | 4 | 7 |
| Blowing agent (parts by weight) | | | | | | | | | | | |
| Water | 4.0 | 4.0 | 4.0 | 4.0 | 4.0 | 4.0 | 4.0 | 4.0 | 4.0 | 4.0 | 3.0 |
| R-11 | 20 | 20 | 20 | 20 | 20 | 20 | 20 | 20 | 20 | 20 | 25 |
| Catalyst (parts by weight) | | | | | | | | | | | |
| NMIZ | 3.2 | — | — | — | 3.1 | 3.2 | — | — | — | — | 3.4 |
| DMIZ | — | 2.6 | — | — | — | — | — | — | — | — | — |
| DMAPIZ | — | — | 3.9 | — | — | — | — | — | — | — | — |
| IBIZ | — | — | — | 3.5 | — | — | — | — | — | — | — |
| TEDA-L33 | — | — | — | — | — | — | 2.9 | — | — | — | — |
| TMHMDA | — | — | — | — | — | — | — | 2.0 | — | 2.0 | — |
| DMCHA | — | — | — | — | — | — | — | — | 2.5 | — | — |
| Polyisocyanate (% by weight) | | | | | | | | | | | |
| Crude MDI | 100 | 100 | 100 | 100 | 50 | 75 | 100 | 100 | 100 | 50 | 100 |
| Sucrose-type TDI prepolymer | — | — | — | — | 50 | 25 | — | — | — | 50 | — |
| Reactivity (seconds) | | | | | | | | | | | |
| Cream time | 14 | 14 | 12 | 13 | 11 | 13 | 13 | 11 | 10 | 9 | 14 |
| Gel time | 50 | 49 | 49 | 51 | 52 | 51 | 50 | 49 | 50 | 49 | 51 |
| Tack-free time | 59 | 60 | 62 | 63 | 67 | 63 | 58 | 58 | 64 | 64 | 61 |
| Rise time | 72 | 73 | 72 | 74 | 88 | 79 | 70 | 71 | 75 | 76 | 75 |
| Foam properties | | | | | | | | | | | |
| Foam density (kg/m$^3$) | 24.9 | 24.7 | 24.2 | 24.8 | 24.2 | 24.2 | 23.9 | 23.3 | 23.2 | 24.6 | 27.0 |
| Thermal conductivity ((Kcal/m.h.°C.) × 10$^2$) | 1.56 | 1.56 | 1.57 | 1.57 | 1.51 | 1.54 | 1.58 | 1.60 | 1.62 | 1.54 | 1.48 |
| Friability | ⊚ | ⊚ | ⊚ | ⊚ | ○ | ⊚ | X | Δ | X | X | ⊚ |

TABLE 2

| | Examples | | Comparative examples | | | Examples | | | |
|---|---|---|---|---|---|---|---|---|---|
| | 8 | 9 | 5 | 6 | 7 | 10 | 11 | 12 | 13 |
| Blowing agent (parts by weight) | | | | | | | | | |
| Water | 3.0 | 3.0 | 3.0 | 3.0 | 3.0 | 6.0 | 6.0 | 7.0 | 4.0 |
| R-11 | 25 | 25 | 25 | 25 | 25 | 10 | 10 | 5 | 20 |
| Catalyst (parts by weight) | | | | | | | | | |
| NMIZ | — | 3.3 | — | — | — | 4.0 | 3.8 | 4.3 | 1.2 |
| DMIZ | 2.7 | — | — | — | — | — | — | — | — |
| DMAPIZ | — | — | — | — | — | — | — | — | — |
| IBIZ | — | — | — | — | — | — | — | — | — |
| TEDA-L33 | — | — | 3.0 | — | — | — | — | — | — |
| TMHMDA | — | — | — | 2.3 | 2.2 | — | — | — | 1.2 |
| DMCHA | — | — | — | — | — | — | — | — | — |
| Polyisocyanate (% by weight) | | | | | | | | | |
| Crude MDI | 100 | 50 | 100 | 100 | 50 | 100 | 50 | 100 | 100 |
| Sucrose-type TDI prepolymer | — | 50 | — | — | 50 | — | 50 | — | — |
| Reactivity (seconds) | | | | | | | | | |
| Cream time | 14 | 12 | 13 | 11 | 9 | 15 | 13 | 15 | 12 |
| Gel time | 49 | 51 | 48 | 48 | 50 | 51 | 52 | 50 | 49 |
| Tack-free time | 62 | 68 | 57 | 61 | 66 | 61 | 64 | 65 | 59 |
| Rise time | 77 | 89 | 74 | 79 | 84 | 76 | 79 | 74 | 75 |
| Foam properties | | | | | | | | | |
| Foam density (kg/m$^3$) | 26.9 | 26.8 | 26.9 | 26.2 | 26.4 | 23.9 | 24.1 | 24.5 | 23.8 |
| Thermal conductivity ((Kcal/m.h.°C.) × 10$^2$) | 1.50 | 1.44 | 1.53 | 1.54 | 1.47 | 1.83 | 1.79 | 1.99 | 1.58 |
| Friability | ⊚ | ⊚ | Δ | Δ | X | ⊚ | ○ | ○ | ○ |

EXAMPLES 14-18, AND COMPARATIVE EXAMPLES 8 AND 9

The mixing ratio of the component materials (namely the formulations) were as shown below. With the catalyst varied, the foaming tests were conducted under a predetermined conditions. The properties of the resulting foams including the low-temperature adhesiveness, hardness, etc. were measured by the methods described below. The results of the tests are shown in Table 3.

| | |
|---|---|
| R-11[4] | 40 parts by weight |
| Catalyst[5] | Varied |

-continued

| a. Formulation | |
|---|---|
| Isocyanate[6] | (NCO/OH = 1.10) |

[1]Tetrakis(2-hydroxypropyl)ethylenediamine. OH value = 768 mgKOH/g. (NP-300, made by Sanyo Chemical Industries, Ltd.)
[2]Aromatic amine type polyol. OH value = 460 mgKOH/g GR-46, made by Takeda Chemical Industries, Ltd.)
[3]Silicone surfactant (L-5340, made by NIHON Unicar Co., LTD.)
[4]Trichlorofluoromethane (made by Mitsui Fluorochemical K.K.)
[5]Catalyst used and the abbreviation of the catalyst in the Tables:
NMIZ: 1-methylimidazole
DMIZ: 1,2-dimethylimidazole
DMAPIZ: 1-(3-dimethylaminopropyl)imidazole
IBIZ: 1-isobutyl-2-methylimidazole
TEDA-L33: 33% triethylenediamine solution in dipropylene glycol (TEDA-L33 made by Tosoh Corporation)
TMHMDA: tetramethylhexamethylenediamine (TOYOCAT-MR, made by Tosoh Corporation)
[6]Crude MDI: NCO concentration = 31.0% (MR-200, made by NIHON Polyurethane Co., LTD.)

b. Foaming conditions:
  Starting material liquid temperature: 20±1° C.
  Stirring speed: 6000 rpm (5 seconds)
  Mold: Foamed in aluminum box (dimension: 25×25×25 cm)
  Mold temperature: 10° C.
c. Measured items:
  The items below were measured.
Reactivity, and foam density:
  Foaming was conducted at 20° in a 2-liter cup, and the reactivity, and the density of the center portion was measured.
  Cream time: Time lapse before start of foaming (seconds)
  Gel time: Time for resinification (cobwebbing) (seconds)
  Tack-free time: Time lapse before the surface of the foam becomes tack-free (seconds)
  Rise time: Time lapse before the foam stop rising (seconds)
Low-temperature adhesion strength:
  Five iron pieces of 2.5×10 cm (1 mm thick) were placed on a mold, and cooled to 10° C. The liquid starting material mixture was poured thereon, and allowed to foam. 10 minutes later, the resulting foam was taken out from the mold. The low-temperature adhesion strength was evaluated by peeling, in the upward direction, the iron piece which was fixed with one face to a spring balance.
Foam hardness:
  Foaming was conducted in a mold cooled to 10° C. 10 minutes later, the hardness of the foam was measured with a Shore C hardness meter.

As is evident from Table 3, rigid polyurethane foams excellent in low-temperature adhesiveness and satisfactory in foam hardness were prepared in Examples 14-18 where NMIZ, DMIZ, DMAPIZ, and IBIZ respectively used as the catalyst. On the contrary, in Comparative examples 8 and 9, the resulting foams were inferior in both low-temperature adhesiveness and foam hardness.

TABLE 3

| | Examples | | | | | Comparative examples | |
|---|---|---|---|---|---|---|---|
| | 14 | 15 | 16 | 17 | 18 | 8 | 9 |
| Catalyst (parts by weight)[1] | | | | | | | |
| NMIZ | 2.0 | — | — | — | 1.0 | — | — |
| DMIZ | — | 1.6 | — | — | — | — | — |
| DMAPIZ | — | — | 2.4 | — | — | — | — |
| IBIZ | — | — | — | 2.0 | — | — | — |

TABLE 3-continued

| | Examples | | | | | Comparative examples | |
|---|---|---|---|---|---|---|---|
| | 14 | 15 | 16 | 17 | 18 | 8 | 9 |
| TEDA-L33 | — | — | — | — | — | 1.7 | — |
| TMHMDA | — | — | — | — | 0.6 | — | 1.2 |
| Lead octylate | 0.04 | 0.04 | 0.04 | 0.04 | 0.04 | 0.04 | 0.04 |
| Reactivity (seconds) | | | | | | | |
| Cream time | 6 | 6 | 6 | 6 | 6 | 6 | 5 |
| Gel time | 12 | 12 | 12 | 12 | 12 | 12 | 11 |
| Tack-free time | 14 | 14 | 14 | 15 | 14 | 14 | 14 |
| Rise time | 20 | 19 | 19 | 20 | 21 | 21 | 18 |
| Foam properties | | | | | | | |
| Foam density (kg/m$^3$) | 24.6 | 24.7 | 24.5 | 25.0 | 24.5 | 25.0 | 24.8 |
| Adhesion strength (g/cm$^2$) | 35 | 37 | 35 | 33 | 30 | 15 | Peel off immediately |
| Foam hardness | 58 | 59 | 57 | 52 | 46 | 33 | 21 |

[1]Parts based on 100 parts by weight of polyol

Having described the present invention, it will be apparent to the artisan that many changes and modifications can be made to the above embodiments without departing from the scope and the spirit of the present invention.

What is claimed as new and desired to be secured by Letters Patent of the United States is:

1. A process for producing a rigid polyurethane foam having a foam density of from 10 to 60 kg/m$^3$ by reacting a polyol with a polyisocyanate in the presence of a catalyst, a blowing agent, and a foam stabilizer; said blowing agent comprising water in an amount of not less than 2.0 parts by weight and a halogenated hydrocarbon in an amount of not more than 35 parts by weight based on 100 parts by weight of the polyol; said catalyst being at least one of the imidazoles represented by the formula (I):

$$R_4 \rule{2cm}{0.4pt} R_3 \atop R_1-N \underset{R_2}{\diagdown\diagup} N \qquad (I)$$

where $R^1$ is alkyl having 1 to 4 carbons, benzyl, dimethylaminopropyl, or hydroxyalkyl having 1 to 3 carbons; $R^2$ is hydrogen, alkyl having 1 to 4 carbons, allyl, or benzyl; and $R^3$ and $R^4$ are independently hydrogen, methyl, or hydroxymethyl.

2. A process for producing a spray-type rigid polyurethane foam by mixing and foaming a polyol and a polyisocyanate in the presence of a catalyst, a blowing agent, and a foam stabilizer according to a spray method; said blowing agent comprising water in an amount of not less than 0.5 parts by weight and a halogenated hydrocarbon in an amount of not more than 60 parts by weight based on 100 parts by weight of the polyol; and said catalyst being at least one of the imidazoles represented by the formula (I):

$$R_4 \rule{2cm}{0.4pt} R_3 \atop R_1-N \underset{R_2}{\diagdown\diagup} N \qquad (I)$$

where $R^1$ is alkyl having 1 to 4 carbons, benzyl, dimethylaminopropyl, or hydroxyalkyl having 1 to 3 carbons; $R^2$ is hydrogen, alkyl having 1 to 4 carbons, allyl, or benzyl; and $R^3$ and $R^4$ are independently hydrogen, methyl, or hydroxymethyl.

3. The process of claim 1, wherein the blowing agent comprises 3.0 parts by weight or more of water and 30 parts by weight or less of the halogenated hydrocarbon based on 100 parts by weight of the polyol.

4. The process of claim 2, wherein the blowing agent comprises 2.0 parts by weight or more of water and 50 parts by weight or less of the halogenated hydrocarbon based on 100 parts by weight of the polyol.

5. The process of claim 1, wherein the polyisocyanate is diphenylmethane-4,4'-diisocyanate or a polymeric isocyanate thereof or a mixture thereof; or a mixed polyisocyanate comprising diphenylmethane-4-4'-diisocyanate or a polymeric isocyanate thereof or a mixture thereof, and toluene diisocyanate or prepolymer thereof or a mixture thereof.

6. The process of claim 5, wherein the concentration of toluene diisocyanate prepolymer in the mixed polyisocyanate is not more than 70% by weight.

7. The process of claim 2, wherein the polyisocyanate is diphenylmethane-4,4'-diisocyanate or a polymeric isocyanate thereof or a combination thereof.

8. The process of claim 1 or claim 2, wherein the imidazole compound is at least one selected from the group consisting of 1-methylimidazole, 1,2-dimethylimidazole, 1-(3-dimethylaminopropyl)imidazole, 1-n-butyl-2-methylimidazole, and 1-isobutyl-2-methylimidazole.

* * * * *